United States Patent Office 3,306,313
Patented Feb. 28, 1967

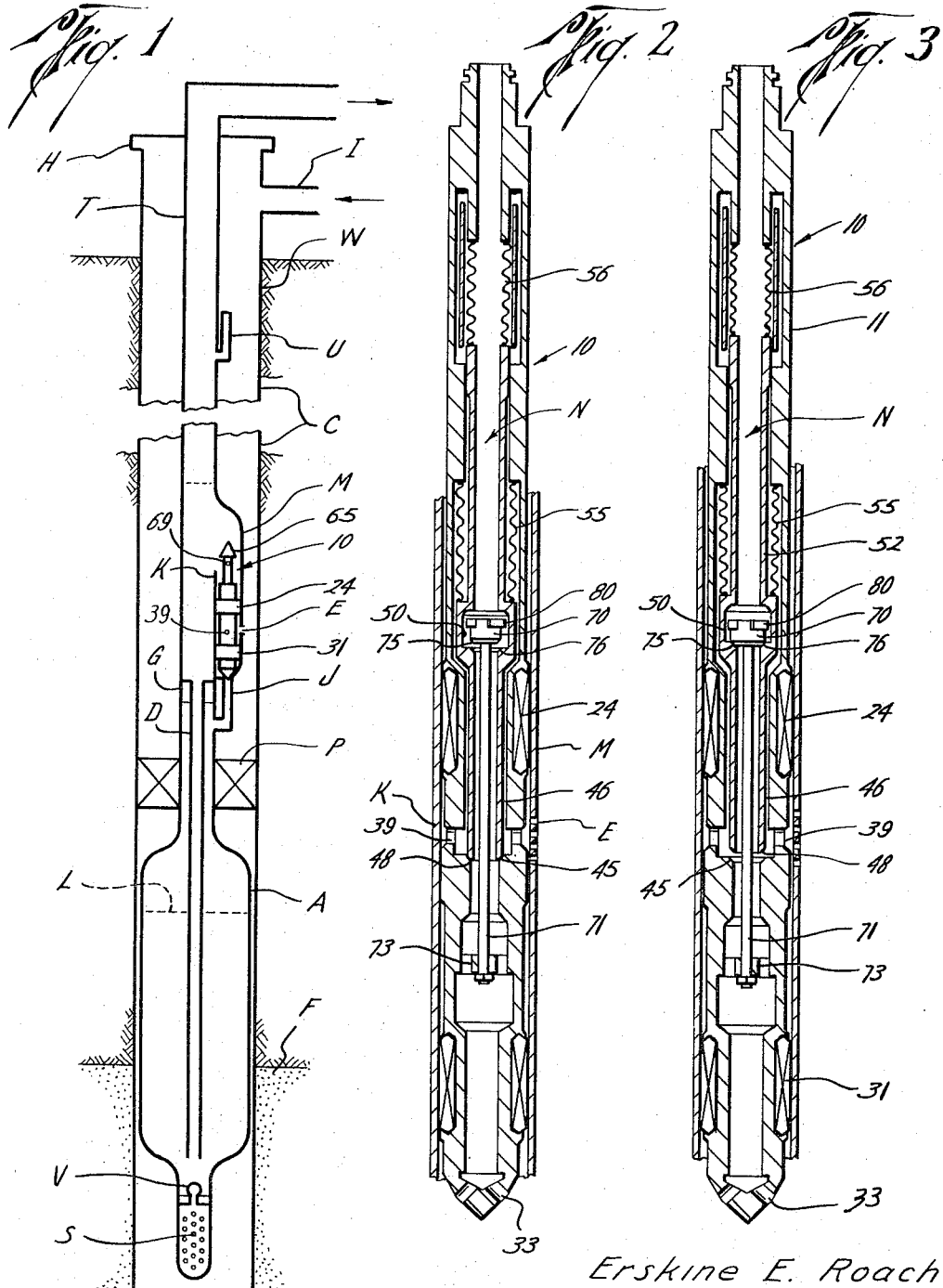

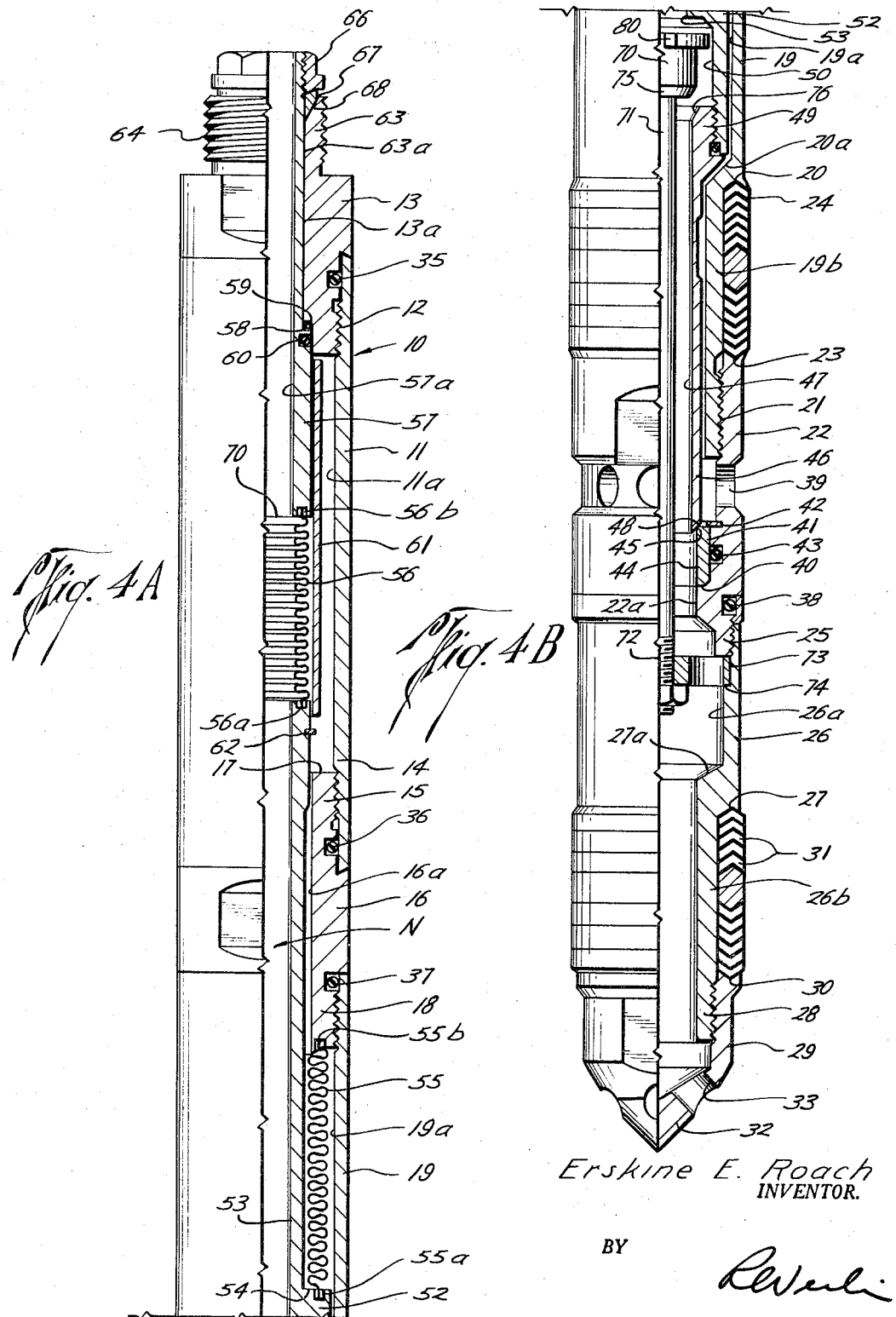

3,306,313
GAS LIFT VALVE
Erskine E. Roach, Houston, Tex., assignor to
Harold L. Brown, Houston, Tex.
Filed Dec. 30, 1960, Ser. No. 79,696
9 Claims. (Cl. 137—102)

This invention relates to gas lift valves and more particularly to a gas lift valve having incorporated therein a vent passage controlled by a second or auxiliary valve operable in response to the movements of the main gas injection valve.

Many oil wells requiring artificial gas lift have very low bottom-hole pressures such that the installations for applying artificial gas lift employ accumulation chambers which are enlarged casings connected to the lower end of the production tubing and which are designed to permit accumulation of a body of oil or other formation fluids which may then be forced upwardly through the tubing by applying gas pressure to the surface of the body of the accumulated fluid.

Because of the low bottom-hole pressures available in wells of the kind mentioned, the chamber arrangement is employed in order to permit accumulation of a substantial body of fluid with a minimum hydrostatic head, so as to obviate, to the greatest extent possible, back pressure on the producing formations which would tend to hinder the inflow of well fluids into the chamber. Thus, in order to obtain effective filling of the chamber, it is necessary to continuously vent any gas which is produced with the formation fluids into the accumulating chamber, as well as any gas being displaced by build-up of the fluid column in the chamber. Heretofore, such chambers have been vented by the use of a small orifice or by a differential valve mechanism providing communication between the top of the chamber and the well tubing. The use of a small orifice has the disadvantage that upon injecting power gas for elevating the accumulated fluid, some of this gas will bleed through the orifice causing a waste of power. The resulting loss in efficiency is particularly marked where relatively large orifices are required, as in cases where substantial quantities of gas enter the chamber with the incoming liquid. To obviate this type of loss, present practices, in many cases, have employed a differential valve to control the vent passage, the differential valve being set at a pressure low enough so that the power gas may quickly build up sufficient pressure in the top of the chamber to close the valve. At the same time, the differential setting of the valve had to be high enough so that the sum of the pressures of the produced gas and the displaced gas would not cause the differential valve to close. In many instances, the flow characteristics of the well were not known exactly. Under such conditions appropriate settings for the differential valve could not be made. The result of improper sizing of the differential valve or of the orifice arrangements was that the accumulation chamber would not fill and the system was thereby rendered ineffective.

In certain low bottom-hole pressure wells where production might otherwise be increased by the use of a chamber installation, the quantity of the produced gas is so high that neither the orifice means nor a differential valve could be designed to keep the top of the chamber effectively vented.

The present invention has for its principal object the provision of a form of gas lift valve which may be used in conjunction with the chamber system and which is effective for solving the difficulties encountered in use of the more conventional orifice or differential valve installations.

An important object is the provision of a valve capable of installation by means of wire line retrievable equipment and side-pocket mandrels now commonly used in gas lift installations.

The gas lift valve, in accordance with this invention, comprises a main injection valve of the gas pressure-loaded type adapted to control communication between the well casing containing the power gas and the top of the chamber in a chamber installation of the kind previously described. A vent passage of relatively large cross-sectional area is incorporated in the body of the valve to provide communication between the top of the chamber and the well tubing through which the well fluids are discharged from the chamber, the vent passage being controlled by a second or auxiliary valve which operates to close the vent passage when the main injection valve is open and to open the vent passage when the main injection valve closes.

An important object of the invention is to provide a valve having a large gas venting capacity while, at the same time, preventing undue wastage of power gas and assuring maximum efficiency in application of the power gas for lifting fluid accumulating in the accumulation chamber.

Further objects are to provide a combination valve of the general character described which is balanced; which is relatively simple in construction; and which operates with a high degree of efficiency and freedom from operating troubles.

Other and more specific objects and advantages of this invention will become apparent from the following detailed description when read in conjunction with the accompanying drawing which illustrates a useful embodiment in accordance with this invention.

In the drawing:

FIG. 1 is a generally diagrammatic view of a gas lift installation of the accumulation chamber type, illustrating the organization of apparatus including the gas lift valve in accordance with this invention, in its operating relationship to the other parts of the system;

FIG. 2 is a longitudinal sectional, partly diagrammatic view of the gas lift valve in accordance with this invention, showing the main and auxiliary valve elements in the positions occupied during the venting stage;

FIG. 3 is a view similar to FIG. 2, showing the main and auxiliary valve elements in the positions occupied during injection of power gas through the main injection valve;

FIGS. 4A and 4B, together, constitute a longitudinal quarter-sectional view of the gas lift valve, the main and auxiliary valve elements being shown in the venting position as in FIG. 2.

Referring to the drawing and FIG. 1 in particular, there is shown a well bore W lined with a conventional casing C extending into an oil producing formation F. The top of the casing is closed by a conventional wellhead H having an inlet connection I for the introduction of power gas by any one of the various conventional arrangements. Extending through the bore of casing C is a tubing string T through which the well fluids are produced. The tubing string has secured to its lower end an enlarged vessel forming an accumulation chamber A, the lower end of which is connected to a screen nipple S, through which the well fluids enter chamber A. A standing valve V is positioned between screen nipple S and the inlet to chamber A to permit entry of fluids into the chamber, while preventing back-flow from the chamber. A dip tube D extends through the bore of tubing T from a point above the chamber to a point near the bottom of the chamber, the lower and upper ends of the dip tube D being open. A seal G is provided for the annular space between the upper end of the dip tube D and the wall of tubing T. A well packer P, of any conventional form, is positioned to seal between tubing T and casing C at a point just above chamber A and below seal G. In the installation illustrated, tubing string T is fitted with a side pocket mandrel M, of generally conventional form, having in the interior thereof the side pocket K adapted to receive the gas lift valve, designated generally by the numeral 10, constructed in accordance with this invention. Mandrel M has ports E in the exterior wall thereof through which power gas from the casing may be admitted into the pocket K, as will be subsequently described. The lower end of pocket K communicates with one end of a short conduit J, the other end of which is in communication with the bore of tubing T at a point below internal seal G, thereby placing pocket K in communication with the interior of the top of chamber A. A conventional unloading valve U may be mounted on tubing string T at an appropriate point above mandrel M, this being a conventional arrangement for such gas lift installations.

Referring now to FIGS. 4A and 4B, valve 10 comprises a tubular outer casing comprising a plurality of co-axially connected tubular sections, which, considered from the upper end downwardly, include the dome housing 11 having a bore 11a which is internally threaded at its upper end to provide the socket 12 for the threaded reception of a closure plug or tail bushing 13. The lower end of dome housing 11 is likewise internally threaded at 14 to receive the externally threaded pin 15 at the at the upper end of a bellows sub 16. The upper end of threaded pin 15 defines the upwardly facing internal shoulder 17 in bore 11a. The lower end of sub 16 is reduced in diameter and externally threaded to form the pin 18 which is threadedly received in the internally threaded upper end of a bellows housing 19 having the bore 19a. Bellows housing 19 has a lower portion 19b which is reduced in both internal and external diameters to form the downwardly facing external shoulder 20 and the tapered upwardly facing internal shoulder 20a. Portion 19b is externally threaded at its lower end at 21 to be threadedly received in the upper end of a tubular valve seat receiver 22 having a bore defining a valve chamber 22a. The upper end of the seat receiver forms an external shoulder 23 spaced from shoulder 20. A set of packing rings 24 is mounted about the exterior of the lower end portion of bellows housing 19 between shoulders 20 and 23, being compressed therebetween when seat receiver 22 is screwed on to threaded end 21 of the bellows housing. At an intermediate point between its ends seat receiver 22 has a plurality of radial ports 39 which open into valve chamber 22a from the exterior of the receiver. The lower end of seat receiver 22 is reduced in external diameter to form the externally threaded pin 25 which is adapted to be received in the upper end of the bore 26a of a tubular lower packing retainer 26, the lower portion 26b of which is reduced in both internal and external diameters defining the downwardly facing external shoulder 27 and the tapered internal shoulder 27a. At its lower end the retainer is formed as an externally threaded pin 28 to be received in the bore of the internally threaded upper end portion of a nose member 29, the upper end of which defines an upwardly facing shoulder 30 spaced from shoulder 27. A series of packing rings 31 are mounted about the exterior of the lower packing retainer between shoulders 27 and 30 and compressed therebetween when nose member 29 is screwed on to threaded end 28 of the lower packing retainer. The lower end wall 32 of nose member 29 is conically tapered and has a number of ports 33 therethrough to provide communication between the interior of the valve casing and the exterior thereof.

To assure fluid-tight connections between the various sections comprising the valve casing, O-ring seals 35, 36, 37, and 38 are appropriately disposed between the several connections between the casing sections.

In seat receiver 22 a portion of the wall of chamber 22a is enlarged from a point beginning below ports 39 to define an upwardly facing annular shoulder 40. A valve seat ring 41 is seated on shoulder 40 and is removably secured on the seat by means of a snap ring 42 mounted in the wall of chamber 22a. An O-ring seal 43 is positioned to seal between the exterior of seat ring 41 and the wall of the valve chamber. Seat ring 41 has an axial bore 44 of relatively large diameter which is substantially flush with the wall of the valve chamber. The upper inner edge of seat ring 41 is chamfered at 45 to form a valve seat.

The main injection valve comprises an elongate tubular valve 46 having an axial bore 47, of substantially the same diameter of seat bore 44, positioned for longitudinal movement in the bore of the valve casing and chamfered about its lower end at 48 to form a closure surface adapted to complement and engage seat 45 of the seat ring. The upper end of valve 46, which extends above shoulder 20a, is radially thickened outwardly and externally threaded to form the pin 49 which is adapted to be received in the internally threaded socket 50 formed in the lower end portion of a valve stem extension 52 having an axial bore 53, the diameter of which is less than that of socket 50, but substantially the same as the diameter of bore 47 of the main valve. At a point a short distance above socket 50, extension 52 is reduced in external diameter to form the upwardly facing annular shoulder 54 spaced below the lower end of pin 18 on the bellows sub 16. A conventional tubular, flexible, metallic bellows member 55 is mounted in the annular space provided between the reduced diameter portion of extension 52 and the wall of bellows housing 19, the opposite ends of bellows 55, being appropriately sealingly secured at 55a and 55b, respectively, to shoulder 54 and the lower end of pin 18. Bellows 55 thus provides a sealed flexible connection between the casing of valve 10 and valve stem extension 52, allowing a limited degree of longitudinal movement of stem extension 52 relative to the valve casing.

The upper end of valve stem extension 52 is sealingly secured at 56a to the lower end of a second flexible bellows 56, the upper end of which is secured at 56b to a sleeve 57, having an axial bore 57a, which extends upwardly through bore 11a of dome housing 11, and thence through the bore 13a of tail bushing 13. Sleeve 57 is provided at a point intermediate its ends with an external shoulder 58 which is abuttable against a downwardly facing internal shoulder 59 formed in bore 13a of the tail bushing to provide a stop for limiting upward movement of sleeve 57. An O-ring seal 60 is positioned to seal between sleeve 57 and tail bushing 13. A bellows protector sleeve 61 surrounds bellows 56 and the adjacent end portions of sleeve 57 and stem extension 52. A lug 62 projects laterally from the exterior of stem extension 52 near its upper end and serves to limit downward movement of protector sleeve 61, while also limiting downward movement of the stem extension by engagement with the upper end of pin 15, as may occur during the operation of the valve. The upper end of sleeve 57 projects upwardly through bore 13a of the tail bushing and through the bore 63a of boss 63, formed on the upper end of the tail bushing. Boss 63 is externally threaded at 64 to receive a fishing neck 65 of conventional form, as illustrated diagrammatically in FIG. 1, fishing neck 65 having one or more lateral openings 69 providing communication between bore 57a and the interior of tubing string T. The upper end of sleeve 57 projects above the upper end of boss 63 and is externally threaded to receive a nut 66 having a downwardly extending, inwardly tapering annular flange 67 which is receivable in a correspondingly tapered seat 68 in the upper end of the bore of boss 63.

Bellows 56 forms a flexible seal connecting the valve stem extension to sleeve 57, thereby allowing a degree of longitudinal movement of the valve stem in the valve casing within the limits of compressibility of the bellows.

Bellows 56, being of the conventional tubular type, provides an axial bore 70a substantially flush with bore 53 of the stem extension 52 and bore 57a of sleeve 57. The diameter of bore 70a of bellows 56 is made generally equal to bore 44 of seat ring 41 or otherwise so related thereto as to substantially balance the valve and reduce the operating spread for a valve having the large port area provided in the valve in accordance with this invention. The several communicating bores 26a, 22a, 44, 47, 51, 53, 70a and 57a, which extend from bottom to top of the valve, constitutes a vent passage, designated generally by the letter N, through which gases passing through conduit J from chamber A enter the valve through ports 33 and flow upwardly through the valve into the interior of the tubing string.

Flow of gases through vent passage N is controlled by an auxiliary valve 70 fixedly mounted on the upper end of an elongate cylindrical stem 71 which extends downwardly through bore 47 of valve stem 46 and has its lower end threaded at 72 and secured into an anchoring spider 73. The outer periphery of spider 73 is clamped between a shoulder 74 in bore 26a of the lower packing retainer and the lower end of pin 25 of the seat receiver when the latter is screwed into the lower packing retainer. The length of stem 71 is made such that auxiliary valve 70 will be within socket 50. The periphery of the lower end of auxiliary valve 70 is chamfered to form the seating surface 75 which is adapted to be engaged by the tapered seat 76 formed on the upper inner edge of thickened end portion 49 of valve stem 46. Auxiliary valve 70 is so disposed relative to end portion 49 that when main valve 46 moves upwardly to its open position relative to seat 45, the upper end of main valve 46 will move seat 76 into closing engagement with seating surface 75 of auxiliary valve 70 (FIG. 3). A number of angularly spaced radially projecting centering lugs 80 are mounted on the periphery of auxiliary valve 70 near its upper end for guidingly engaging the wall of recess 50.

Bore 11a, bore 16a and the interior of bellows 55, together, define a pressure chamber or "dome" which is conventionally filled with air or gas under such predetermined pressure as may be desired for controlling the opening and closing of the main injection valve. The dome pressure normally acts to hold main injection valve 46 in closed position on seat 45. Power gas entering ports 39 will act on the exterior of bellows 55 and main valve 46 to urge the latter to the open position against the closing force exerted by the loading gas in the dome.

In operation, valve 10 will be inserted, by means of conventional wire line equipment, in pocket K of mandrel M. Packings 24 and 31 are arranged on the body of the valve to seal off the pocket at points above and below mandrel ports E, so that power gas entering through the latter will enter inlet valve ports 39. Seating of valve 10 in pocket K will place nose ports 33 in communication with conduit J, thereby placing the lower end of vent passage N in communication with the upper portion of the interior of chamber A.

With valve 10 thus seated in the mandrel pocket and with the dome pressure in the valve being greater at this stage of the operation than the pressure of the power gas inside casing C, main valve 46 will remain in the closed position on seat 45, as seen in FIGS. 2 and 4B. With main valve 46 in this closed position, auxiliary valve 70 will be in the open position, since seat 76 will be in retracted position relative to valve 70 and its seating surface 75. In this position of the parts, any gas trapped above the fluid level L in chamber A and gas which may be entering the chamber with fluid coming in from the formation F, will flow upwardly through conduit J and vent passage N, and out opening 69 in the fishing neck 65 connected to the upper end of the valve, and will then flow into the bore of tubing T and thence toward the surface. This venting of gas will continue until the level of fluid in chamber A has risen to a sufficient height to provide a suitable volume or "slug" of fluid to be raised to the surface. The time factors involved will be determined in accordance with conventional practice, so as to operate conventional surface controls which will cause power gas to be delivered through inlet connection I in the casing head and thence into the casing annulus. When the pressure of the power gas in the annulus has built up to a point greater than the closing pressure on the main injection valve, the power gas will move main valve 46 to its open position compressing bellows 55 and bellows 56, the latter, as noted, acting as a resilient balancing seal for the valve. When main valve 46 moves to the open position, this movement will bring seat 76 into closing contact with seating surface 75 on auxiliary valve 70, thereby closing vent passage N and preventing the loss of power gas to the tubing. The power gas will thereby be directed through the lower end of the vent passage, nose ports 33 and conduit J into the upper end of chamber A above the level of liquid L therein. The pressure exerted by the power gas on the upper surface of the body of liquid accumulated in chamber A will force the latter downwardly and thence upwardly through the open lower end of dip tube D, whence the fluid will be forced upwardly into mandrel M and tubing string T. The well fluid thus raised into the tubing will continue upwardly under the pressure of the power gas until it reaches the unloading valve U where additional power gas will be injected into the column of fluid and boost it to the surface. In accordance with conventional practice, after a predetermined quantity of power gas has been injected, the supply of power gas will be cut off, allowing the pressure to drop sufficiently to cause the main injection valve to close. This will contemporaneously open the auxiliary valve and re-open vent passage N to the discharge of gases remaining in chamber A to the tubing string and permitting additional well fluids to flow into the chamber in order to repeat the cycle.

The provision of the relatively large diameter vent passage through the valve thus assures against any back-pressure in chamber A which would retard the inflow and accumulation of well fluid, and the arrangement of the auxiliary valve in combination with the main injection valve provides assurance against leakage or loss of power gas when the latter is being injected for purposes of lifting the accumulated body of well fluids to the surface. The use of the balancing bellows 56 is also advantageous in reducing the operating spread for a valve having the large port area provided in a valve in accordance with this invention.

It will be understood that various changes and alterations may be made in the details of the illustrative embodiment of this invention within the scope of the appended claims, but without departing from the spirit of the invention.

What I claim and desire to secure by Letters Patent is:

1. A gas lift valve, comprising, a generally tubular casing having a passageway extending longitudinally thereof and opening at spaced points to the exterior thereof, gas injection ports through the wall of the casing communicating with said passageway intermediate its ends, an annular valve seat in said passageway below said ports, a tubular main valve member mounted in said passageway above said seat and having a pressure-responsive surface, said main valve member being reciprocable relative to said seat for opening and closing communication between said ports and said passageway in response to the pressure of gas entering said ports acting on said surface, first and second resilient sealing connections between the main valve member and the wall of said casing at longitudinally spaced points above said ports, the annular space exteriorly of the main valve member between said first and second sealing connections defining a closed chamber containing pressurizing fluid at a predetermined pressure, and auxiliary valve means positioned in said passageway above said valve seat to cooperate with the main valve member for controlling fluid flow through said passageway, said auxiliary valve means including a stationary closure member positioned relative to the main valve member to close said passageway when the main valve member moves to its open position relative to said seat and to open said passageway when the main valve member moves to its closed position relative to said seat.

2. A gas lift valve, comprising, a generally tubular casing having a passageway extending longitudinally thereof and opening at spaced points to the exterior thereof, gas injection ports through the wall of the casing communicating with said passageway intermediate its ends, an annular valve seat in said passageway below said ports, a tubular main valve member mounted in said passageway above said seat and having a pressure-responsive surface, said main valve member being reciprocable relative to said seat for opening and closing communication between said ports and said passageway in response to the pressure of gas entering said ports acting on said surface, first and second resilient sealing connections between the main valve member and the wall of said casing at longitudinally spaced points above said ports, the annular space exteriorly of the main valve member between said first and second sealing connections defining a closed chamber containing pressurizing fluid at a predetermined pressure, and auxiliary valve means positioned in said passageway above said valve seat to cooperate with the main valve member for controlling fluid flow through said passageway, said auxiliary valve means being actuatable to close said passageway when the main valve member moves to its open position relative to said seat and to open said passageway when the main valve member moves to its closed position relative to said seat, said auxiliary valve means including a stationary passageway-closing member and an annular seating surface carried by the main valve member and movable therewith relative to said closure member.

3. A gas lift valve, comprising, a generally tubular casing having a passageway extending longitudinally thereof and opening at spaced points to the exterior thereof, gas injection ports through the wall of the casing communicating with said passageway intermediate its ends, an annular valve seat in said passageway below said ports, a tubular main valve member mounted in said passageway above said seat and having a pressure-responsive surface, said main valve member being reciprocable relative to said seat for opening and closing communication between said ports and said passageway, in response to the pressure of gas entering said ports acting on said surface, first and second resilient sealing connections between the main valve member and the wall of said casing at longitudinally spaced points above said ports, the annular space exteriorly of the main valve member between said first and second sealing connections defining a closed chamber containing pressurizing fluid at a predetermined pressure, and auxiliary valve means positioned in said passageway above said valve seat to cooperate with the main valve member for controlling fluid flow through said passageway, said auxiliary valve means including a stationary passageway-closing member and an annular seating surface carried by the main valve member and movable therewith relative to said passageway-closing member whereby to close said passageway when the main valve member moves to its open position relative to said seat and to open said passageway when the main valve member moves to its closed position relative to said seat, said first and second sealing connections each comprising a tubular bellows.

4. A gas lift valve according to claim 3 wherein the tubular bellows comprising said first sealing connection is disposed coaxial with said passageway and has a bore substantially equal in diameter to the bore of said annular valve seat.

5. A gas lift valve, comprising, a generally tubular casing having a passageway extending throughout its length and opening to the upper and lower ends thereof, gas injection ports through the wall of the casing communicating with said passageway intermediate its ends, an annular main valve seat in said passageway below said ports, a tubular main valve member mounted in said passageway above said main valve seat and having a pressure-responsive surface, said main valve member being reciprocable relative to said main valve seat for opening and closing communication between said ports and said passageway in response to pressure of gas entering said ports acting on said surface, a first annular bellows member forming a coaxial resilient sealing connection between the upper end of the main valve member and the wall of said casing, a second annular bellows member surrounding the main valve member and forming a resilient sealing connection between the main valve member and the wall of the casing below said first sealing connection, the annular space exteriorly of the main valve member between said first and second sealing connections defining a closed chamber containing pressurizing fluid at a predetermined pressure for seating the main valve member, and auxiliary valve means positioned in said passageway above said main valve seat to cooperate with the main valve member for controlling fluid flow through said passageway, said auxiliary valve means comprising a stationary closure member mounted in the bore of said main valve member and an annular seating surface carried by the main valve member and movable therewith relative to said closure member, whereby to close said passageway when the main valve member moves to its open position relative to said main valve seat and to open said passageway when the main valve member moves to its closed position relative to said main valve seat.

6. A gas lift valve according to claim 5 wherein said first bellows member has a bore substantially equal to that of the main valve seat.

7. A tubular valve unit comprising a pair of concentric inner and outer tubular walls radially spaced apart a distance considerably smaller than the bore of the inner tubular wall to provide a relatively long and narrow annular chamber therebetween, one of said tubular walls including a pair of axially aligned sections of the other and of which one section is an axially contractible tubular bellows having one end fixedly secured in sealing relation with the other tubular wall and thereby closing the adjacent end of the chamber and the other of which sections is an axially shiftable tube secured in sealing relation with the opposite end of the bellows and extended axially therebeyond, said axially shiftable tube having shoulder formation means spaced from the juncture of the axially shiftable tube with the tubular bellows and providing a pair of oppositely facing shoulder surfaces projected laterally from the shiftable tube section and into the narrow chamber between the walls, a second contractible tubular bellows positioned within the narrow chamber and in longitudinally offset nonoverlapping relation to the first mentioned tubular bellows and sealingly secured at one end to said other tubular wall and at its opposite end to said shoulder formation means and thereby partitioning said narrow chamber and isolating said shoulder surfaces by enclosing one thereof within the chamber space on one side of the second tubular bellows and exposing the other shoulder surface within the chamber space on the opposite side of the second tubular bellows, a body of compressible fluid entrapped under pressure within the chamber space between the tubular bellows and active on the enclosed shoulder surface in opposition to shiftable tube section movement in one direction, port means positioned in said other tubular wall for admission of pressurized fluid into said chamber space adjacent to and for action on said other shoulder surface and in counterdirection to the aforesaid force on said enclosed shoulder surface and mating seating portions carried by the respective tubular walls within said chamber and engageable one with the other to close the end of the chamber opposite said adjacent end, one of said seating portions being responsive to movement of the shiftable tube section in said counter-direction and movable away from seating engagement with the other seating portion for lift gas passage through the valve unit.

8. A gas lift valve, comprising,
(a) a generally tubular casing having a passageway extending longitudinally thereof and opening at spaced points to the exterior thereof,
(b) gas injection ports through the wall of the casing communicating with said passageway intermediate its ends,
(c) a tubular main valve member cooperable with an annular seat in said passageway below the gas injection ports, said main valve member being connected to said casing via pressure responsive means defining with said casing a closed annular chamber preloaded with gas at a predetermined pressure, said pressure responsive means being constructed and arranged so that the preload biases the main valve member toward the seat,
(d) said pressure responsive means being arranged to define a reactor surface responsive to the pressure from said gas injection ports to oppose the bias of said preloaded pressure,
(e) auxiliary valve means including passageway-closing means positioned in said passageway above said ports and cooperable with said main valve member in response to the reciprocating movement of the main valve member for controlling fluid flow upwardly through said passageway,
said auxiliary valve means being actuatable to close said passageway when the main valve member moves to its open position and to open said passageway when the main valve member moves to its closed position.

9. A gas lift valve according to claim 10 wherein said auxiliary valve means includes a stationary closure member mounted in said passageway, and an annular seating surface carried by said main valve member and movable therewith relative to said closure member.

References Cited by the Examiner

UNITED STATES PATENTS

| | | | |
|---|---|---|---|
| 2,368,999 | 2/1945 | O'Leary | 103—232 |
| 2,391,542 | 12/1945 | Benard | 103—240 |
| 2,489,665 | 11/1949 | O'Leary | 103—232 |
| 2,790,501 | 4/1957 | Garrett et al. | 166—224 |

ALAN COHAN, *Primary Examiner.*

CHARLES CONNELL, ISADOR WEIL, WILLIAM F. O'DEA, *Examiners.*

D. C. BLOCK, H. WEAKLEY, *Assistant Examiners.*